United States Patent [19]

Valley et al.

[11] Patent Number: 5,023,477
[45] Date of Patent: Jun. 11, 1991

[54] TRANSIENT ENERGY SELF-PUMPED CONJUGATOR AND METHOD

[75] Inventors: George C. Valley, Los Angeles; Thomas F. Boggess, Jr., Newbury Park, both of Calif.

[73] Assignee: Hughes Aircraft Company, Los Angeles, Calif.

[21] Appl. No.: 473,532

[22] Filed: Feb. 1, 1990

[51] Int. Cl.$^5$ .......................... G02B 6/32; H03F 7/00; H02J 3/02; H04J 3/00
[52] U.S. Cl. ..................................... 307/425; 372/21; 372/99; 350/96.18; 350/354; 307/3
[58] Field of Search ............... 350/96.10, 96.18, 96.19, 350/354, 356, 362, 3.64; 372/99, 21; 307/2, 3, 4; 455/607, 617

[56] References Cited

U.S. PATENT DOCUMENTS

| | | | |
|---|---|---|---|
| 4,529,273 | 7/1985 | Gronin-Golomb et al. | 350/354 |
| 4,767,195 | 8/1988 | Pepper | 372/21 X |
| 4,773,739 | 9/1988 | Valley et al. | 350/354 |

OTHER PUBLICATIONS

Vinetskii et al., "Transformation of Intensities and Phases of Light Beams by a Transient 'Undisplaced' Holographic Grating", *Sov.J.Quantum Electron.*, vol. 7, No. 2, Feb. 1977, pp. 230–233.
Eichler et al., "Picosecond Pulse Amplification by Coherent Wave Mixing in Silicon", *Physical Review A*, vol. 35, No. 11, Jun. 1, 1987, pp. 4673–4678.
Dubard et al., "Beam Amplifications by Transient Energy Transfer in GaAs and Si", Proceedings of the SPIE, vol. 1017, No. 27, Sep. 1988, pp. 172–175.
Feinberg, "Optical Phase Conjugation in Photorefractive Materials", within the Text Optical Phase Conjugation, ed. by Fisher, Academic Press, Inc., 1983, pp. 417–443.
Feinberg, "Self-Pumped, Continuous-Wave Phase Conjugator Using Internal Reflection", *Optics Letters*, vol. 7, No. 10, Oct. 1982, pp. 486–488.
Cronin-Glomb et al., "Theory and Applications of Four-Wave Mixing in Photorefractive Media", *IEEE Journal of Quantum Electronics*, vol. QE-20, No. 1, Jan. 1984, pp. 12–30.
Auyang and Wolfe, "Free Carrier Induced Third Order Optical Nonlinearities in Semiconductors", *Journal of the Optical Society of America B*, vol. 6, No. 4, Apr. 1969, pp. 595–605.
H. M. Ma, et al, "Picosecond Pulse Amplification by Wave Mixing in GaAs", Appl. Phys. Letter, vol. 54, No. 20, May 15, 1989, 1989 American Institute of Physics, pp. 1953–1955.

*Primary Examiner*—Akm Ullah
*Attorney, Agent, or Firm*—V. D. Duraiswamy; W. K. Denson-Low

[57] ABSTRACT

Self-pumped phase conjugation is achieved for optical beams with very short pulse durations by a transient energy transfer mechanism. A probe beam is transmitted through a non-linear optical medium, generating a noise beam from the medium. The probe and noise beams are directed along equal time duration paths, preferably contra-directional to each other, back into the non-linear medium where they mix with each other. The peak probe pulse is thus mixed with the peak noise pulse to optimize gain. The thickness and optical coupling coefficient of the non-linear medium, and the angle between the returned probe and noise beams, are selected to produce a noise beam gain which is sufficient to generate a phase conjugate of the input probe beam.

26 Claims, 3 Drawing Sheets

TRANSIENT ENERGY SELF-PUMPED CONJUGATOR AND METHOD

BACKGROUND OF THE INVENTION

1. Field of the Invention

This invention relates to self-pumped phase conjugate mirrors and to short pulse transient optical energy transfer systems.

2. Description of the Related Art

A phase conjugate mirror (PCM) produces a retroreflection of an incident beam, with the phase of the reflected beam reversed from that of the incident beam at the point of reflection. Several different methods of producing phase conjugated beams have been discussed in the literature, including four-wave mixing and self-pumped mechanisms. The theory and operation of PCMs is described in a chapter by Feinberg, "Optical Phase Conjugation in Photorefractive Materials", within the text "Optical Phase Conjugation", ed. by Fisher, Academic Press, Inc., 1983, pages 417-443.

Self-pumped PCMs form a phase conjugate of an input beam without the use of separate pump beams. They have numerous applications in fields such as optical data processing, laser sources and optical diagnostic systems. This elimination of separate pump beams offers considerable practical advantages over other types of conjugators.

Self-pumped PCMs have been developed based upon stimulated Brillouin or Raman scattering, and the photorefractive effect. Those employing Brillouin or Raman scattering are generally used with high power pulsed laser beams, such as from a Nd:YAG laser, but are not practical with low power continuously operated lasers such as HeNe or low flux argon ion laser devices. Self-pumped PCMs based upon the photorefractive effect use a photorefractive material with a high electro-optical coefficient as the phase conjugating medium. This type of self-pumped PCM has been employed with continuously operating, low power lasers. None of these devices work well for pulses on the order of picoseconds in duration, or in general for pulse trains in which the individual pulse durations are less than about 50 picoseconds (ps). SBS PCMs also introduce a small frequency offset on the phase conjugate wave that is undesirable in certain applications.

Self-pumped PCMs based upon the photorefractive effect are described in Feinberg, "Self-Pumped Continuous-Wave Phase Conjugator Using Internal Reflection", Optics Letters, Vol. 7, No. 10, October 1982, pages 486-488, and in Cronin-Golomb et al., "Theory and Applications of Four-Wave Mixing in Photorefractive Media", IEEE Journal of Quantum Electronics, Vol. QE-20, No. 1, January 1984, pages 12-29. Such devices have currently been demonstrated only with continuous wave (cw) and repetitively pulsed lasers, although it may be possible to employ the photorefractive effect to conjugate single nanosecond pulses. For pulses on the order of picoseconds, the photorefractive effect that has been observed is much too weak to produce self-pumped conjugation. In addition, self-pumped PCMs that use the photorefractive effect require materials such as $BaTiO_3$ or strontium barium niobate that are relatively hard to obtain in small crystals, such as $5 \times 5 \times 5$ cm$^3$.

Outside of PCMs, another mechanism that has been observed to yield an energy transfer between optical beams is the transient energy transfer phenomenon. This differs from optical amplification by the photorefractive effect, which is produced by the shifted grating found in photorefractive materials when diffusion is the dominant transport mechanism, or is obtained by a frequency offset between two beams when drift is the dominant transport. The transient energy transfer phenomenon is believed to have been first publicly described by Vinetskii et al., "Transformation of Intensities and Phases of Light Beams by a Transient 'Undisplaced' Holographic Grating", Sov. J. Quantum Electronics, Vol. 7, No. 2, February 1977, pages 230-233, and was further developed in Eichler et al., "Picosecond Pulse Amplification by Coherent Wave Mixing in Silicon", Physical Review, June 1, 1987, pages 4673-4678, and Dubard et al., "Beam Amplification by Transient Energy Transfer in GaAs and Si", Proceedings of the SPIE, Vol. 1017, No. 27, September 1988, pages 172-175.

Transient energy transfers can occur between beams in non-linear optical media when the beams are pulsed very rapidly, with pulse durations less than the grating response time (the time required for an optical grating to build up within the medium). If the pump and probe beam intensities are unequal, a transient energy transfer can occur from the pump to the probe beam if the response time of the medium's non-linearity is on the order of or longer than the pulse duration. Transient energy transfers have been realized using the free-carrier non-linearity, thermal gratings, and the photorefractive effect in $LiNbO_3$. Transient energy transfers for picosecond pulses using the free-carrier non-linearity in GaAs and Si were reported in the Dubard et al. article mentioned above. A probe beam gain on the order of 15 resulting from a transient energy transfer from a separate pump beam was reported in this article.

While the transient energy transfer phenomenon is of interest, it has not addressed the limitations of currently available self-pumped PCMs described above in the area of very short duration pulses.

SUMMARY OF THE INVENTION

The present invention provides a new type of self-pumped PCM which is based upon the transient energy transfer phenomenon, and is operable only for pulsed input beams having a pulse duration less than the grating response time of the non-linear optical medium in which the phase conjugation occurs. Self-pumped operation is realized for previously unattainable short duration pulses.

A non-linear optical medium is provided for the self-pumped operation, preferably GaAs or another semi-insulating semiconductor such as CdTe or InP. A pulsed probe beam with a pulse duration less than the non-linear medium's grating response time is applied to the non-linear medium, and generates a noise beam therein. The probe beam and noise beam are then directed along equal duration paths and returned to the non-linear medium at a selected angle to each other to induce an optical mixing between the beams. The thickness and optical coupling coefficient of the non-linear medium are selected to enhance the amplification of the noise beam to a level at which a phase conjugate of the original probe beam is produced.

In a preferred embodiment, the noise and probe beams are directed along substantially contra-directional paths in the course of being returned to the non-linear medium. The beams are preferably directed by means of a solid transmissive medium which abuts the non-linear medium and has a shape and refractive index to direct the beams as desired by total internal reflection. Alternately, external mirrors can be used. A high amplification of the noise beam into a conjugate of the probe beam has been achieved with a slab of GaAs about 0.5–1 mm thick.

These and other features and advantages of the invention will be apparent to those skilled in the art from the following detailed description, together with the accompanying drawings, in which:

DETAILED DESCRIPTION OF THE INVENTION

Figures 1, 2, 3:
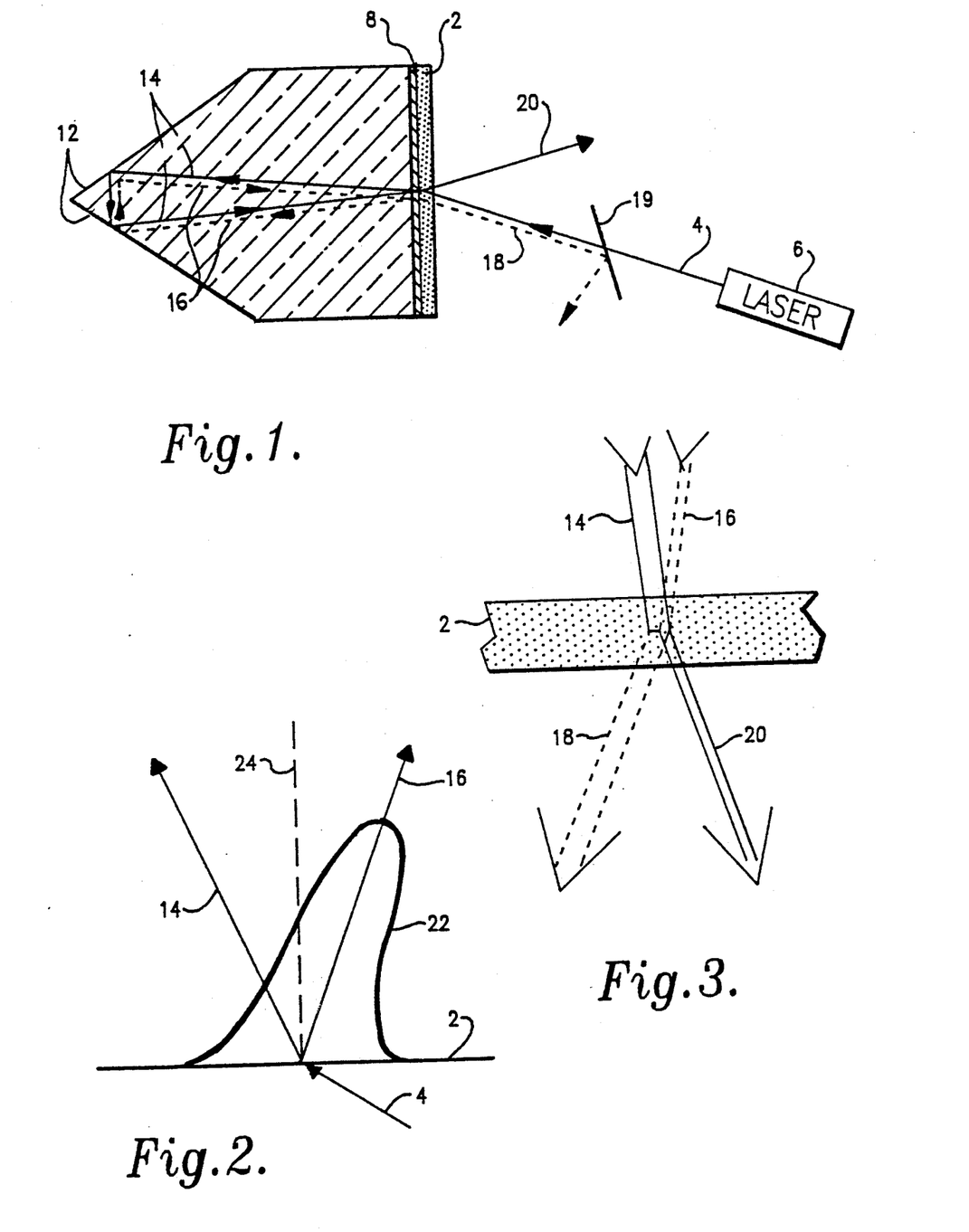
FIG. 1 is a schematic diagram of one embodiment of the invention.
FIG. 2 is a diagram illustrating the generation of a noise beam within the non-linear optical medium.
FIG. 3 is a diagram illustrating the pumping action of the probe beam upon the noise beam to produce a phase conjugate of the probe beam.

FIG. 1 shows a preferred implementation of the invention as a self-contained, self-pumped PCM for a pulse beam with a very short pulse duration. Optical mixing takes place within a slab of non-linear optical material 2. The non-linear medium 2 should have a relatively large coupling coefficient to produce sufficient gain for phase conjugation to take place, and a grating response time longer, than the duration of the applied pulses. While the invention is not restricted to them, semiconductors having lattice defects which make them semi-insulating, such as GaAs:EL2 or InP:Fe are preferred. Other semiconductors suitable for consideration as the non-linear medium include InP, InSb and HgCdTe. Intrinsic or lightly doped semiconductors such as GaAs might also be used, but care should be exercised that they are not overly absorptive at the selected wavelengths.

A pulsed probe beam 4 is generated by a laser 6 and directed into non-linear medium 2 at a predetermined angle, the magnitude of which is discussed below. An anti-reflection coating 8 on the opposite face of medium 2 reduces reflection losses later in the process. A crystal of material preferably cut as a prism 10 which is transmissive to the probe beam 4 abuts against the rear surface of non-linear medium 2. Prism 10 should be substantially transparent at the wavelength of the probe beam 4, and should have at least a rough refractive index match with the non-linear gain medium 2 to avoid large Fresnel losses at the interface between the two. For a non-linear medium 2 such as GaAs, the prism 10 may suitably be formed from semiconductors such as ZnS, ZnSe or CdS.

Prism 10 is formed with rear surfaces 12 at an angle such that probe beam 4 undergoes total internal reflection after transmission through non-linear medium 2, following a path as in internal probe beam 14 that returns it to the non-linear medium at approximately the location of its first pass.

The pulses of probe beam 4 generate noise waves within non-linear medium 2 in the usual fashion. If probe beam 4 is directed into non-linear medium 2 at an appropriate angle, a noise beam 16 (shown in dashed lines) is generated along a preferential path which is at the same absolute angle to perpendicular from the non-linear medium 2 as the probe beam, but on the opposite side of the perpendicular from the probe beam. For the prism geometry illustrated in FIG. 1, noise beam 16 follows a path that is contra-directional to the probe beam path through the prism. The noise beam 16 undergoes total internal reflection off prism surfaces 12 and returns to the non-linear medium 2 at approximately the same location as probe beam 14, but at an angle thereto.

The probe and noise beams thus travel equal distances through prism 10 before returning to non-linear medium 2. This is of crucial importance to the invention, since it means that the maximum values of the short-duration probe and noise pulses will arrive back at the non-linear medium 2 at approximately the same time, where they can mix with each other and establish a transient energy transfer between the two. This results in a maximum degree of energy transfer that, given a proper set-up, will generate a phase conjugate beam from the noise beam 16. The amplified noise beam 16 emerges from non-linear medium as a phase conjugate beam 18 of the original probe beam 4, which can be diverted from laser 6 by a beam splitter 19. The probe beam emerges as a diminished output beam 20.

FIG. 2 illustrates the generation of a noise beam pulse 16 within non-linear medium 2 in response to a pulse from probe beam 4. Noise is generated within non-linear medium 2 as a result of the probe beam pulse 4 striking discontinuities therein. Optical radiation is scattered over an angular spectrum, illustrated by envelope 22. However, there is a preferred noise path along which sufficient noise is generated to establish a beam. This is the path of noise beam 16, which is at an equal angle to a perpendicular 24 from the surface of non-linear medium 2 as the transmitted probe beam 14, but on the other side thereof.

FIG. 3 illustrates the transient energy transfer which takes place within non-linear medium 2 between the returned probe beam 14 and the returned noise beam 16. As mentioned above, the geometry of prism 10 is selected such that these beams meet with their non-linear medium 2 at an angle which induces a mixing between the probe and noise pulses, resulting in a transient energy transfer from the stronger probe beam 14 to the weaker noise beam 16. Thus, weaker noise beam 16 emerges from non-linear medium 2 as an amplified phase conjugate 18 of the input beam, while returned probe beam 14 emerges as the diminished output beam 20.

Figures 4, 6:
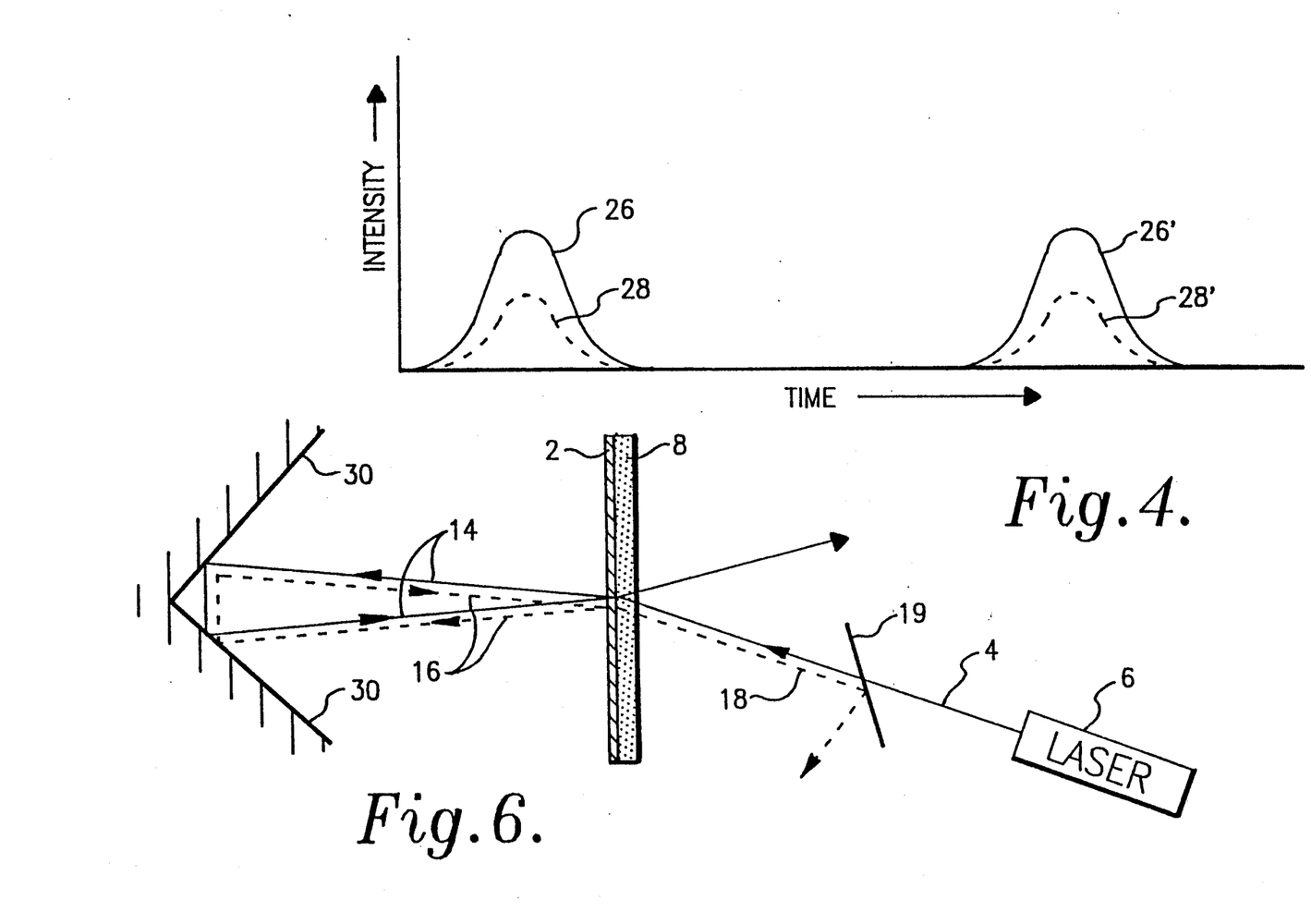
FIG. 4 is a timing diagram illustrating the coordination between the probe and noise beams.
FIG. 6 is a diagram of another embodiment of the invention.

The critical timing control produced by the geometry of prism 10 is illustrated in FIG. 4, which depicts the probe and noise beam intensities at the non-linear medium 2 as a function of time. Initially, a probe beam pulse 26 is transmitted from the laser source into the non-linear medium 2. This produces a corresponding noise pulse 28, indicated in dashed lines. The beam intensities within the non-linear medium diminish essentially to zero while the probe and noise pulses are transmitted contra-directionally through prism 10. Because of their equal distance paths through prism 10, the two pulses arrive back in non-linear medium 2 at substantially the same time, as indicated by superimposed pulses 26' and 28'. The maximum noise pulse intensity thus meets the maximum probe beam pulse intensity within the non-linear medium, producing a maximum transient energy transfer between the two.

As mentioned above, it is desirable that the refractive index of the non-linear medium 2 be approximately matched with that of the transmissive prism 10 to reduce losses at the interface between the two materials. The intensity transmission T of the interface near normal incidence is determined by:

$$T = 1 - (n_1 - n_2)^2 / (n_1 + n_2)^2,$$

where $n_1$ and $n_2$ are the refractive indices of the non-linear medium 2 and the transmissive prism 10, respectively. With GaAs as the non-linear medium and ZnS for the prism, T is equal to 0.965.

The angle of incidence at which the input probe beam 4 strikes the non-linear medium 2 determines the angle between the returned probe beam 14 and noise beam 16, and is an important consideration in obtaining a sufficient transient energy transfer to establish a phase conjugate beam. The angle at which the probe beam is returned to the non-linear medium 2 controls the grating period of the refractive index grating that transfers energy from returned probe beam 14 to returned noise beam 16. The grating response period (diffusion time) $\tau$ is defined by:

$$\tau = \Lambda_g^2 / (4\pi^2 D),$$

where $\Lambda_g$ is the grating period and D is the ambipolar diffusion coefficient (approximately 20 cm$^2$/s in GaAs). Thus, longer pulses require smaller angles between the returned probe and noise beams 14 and 16, and thus a longer prism 10 with a smaller angle apex between prism surfaces 12. For a Nd:YAG laser at 1.06 micron wavelength and GaAS as the non-linear medium, high gain was achieved with an input probe beam angle of 18° to a normal of the GaAs surface, which resulted in an angle of about 10° between the noise and probe beams. An apex angle between prism surfaces 12 of 85° directs the beams on contra-directional paths for this case.

The pulse length that can be accommodated with this system thus depends both upon the nature of the non-linear medium 2, and the angle between the returned probe and noise beams 14 and 16. The Eichler et al. article referred to above described wave mixings between separate input beams having pulse durations of about 16 nanoseconds in one case, and shorter pulse durations of about 50 picoseconds in another case. Although the present invention is applicable to materials having relatively long grating response times, its advantages are best realized when used in conjunction with pulse durations less than 10 ns, and preferably less than about 1 ns, which is the approximate grating response time for several semiconductors. The invention will also find utility in very different systems such as pulsed CO$_2$ lasers (10.6 micron wavelength) with narrow bandgap semiconductors as discussed by Auyang and Wolfe in "Free Carrier Induced Third Order Optical Nonlinearities in Semiconductors", *Journal of the Optical Society of America B*, Vol. 6, No. 4, April 1969, pages 595–605.

Figure 5:
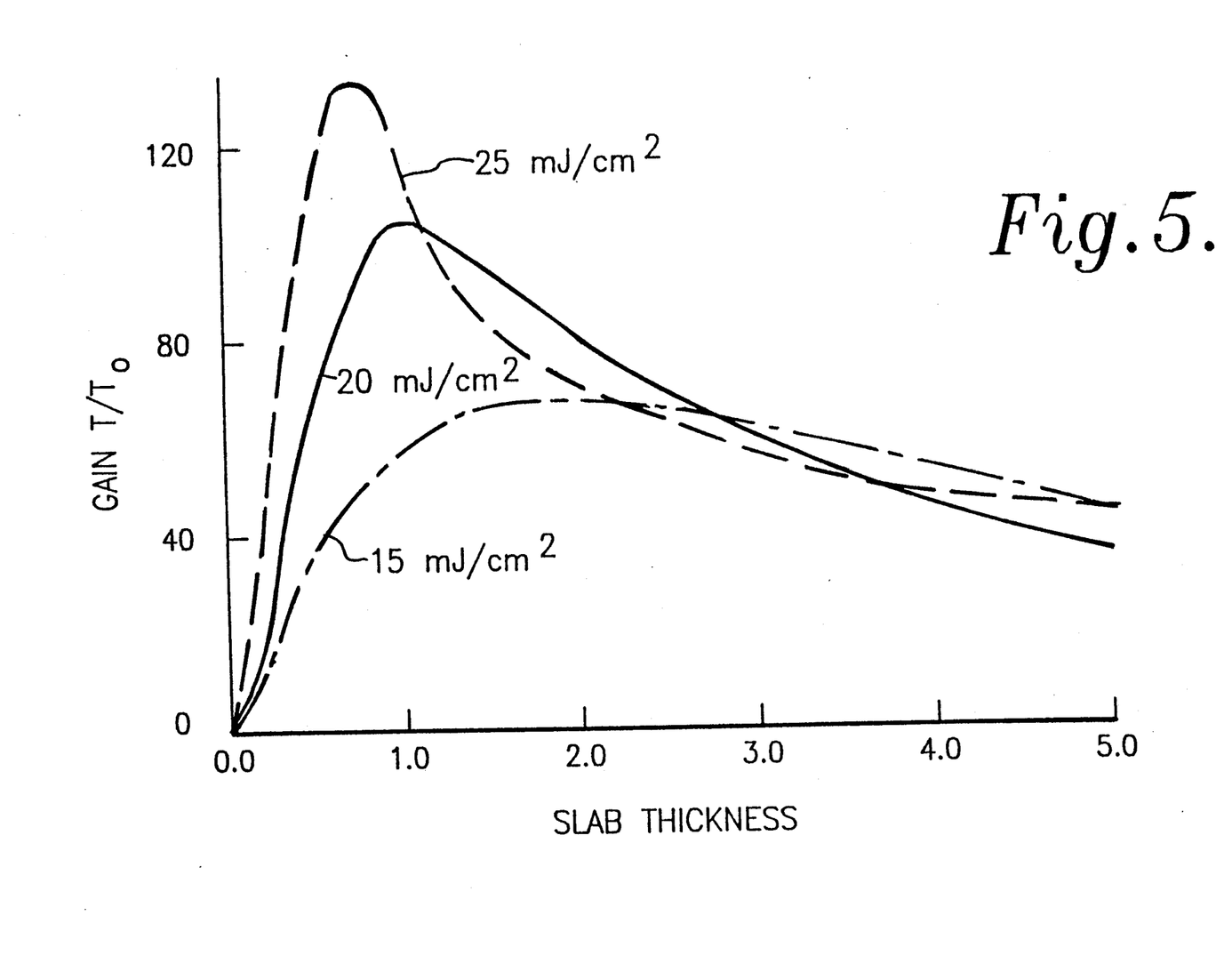
FIG. 5 is a graph of optical gain versus slab thickness for semi-insulating GaAs.

For a practical system, a noise beam gain on the order of about 20 is required to initiate a self-pumping operation. The non-linear medium must have a relatively high coupling coefficient between the noise and probe beams to achieve this level of gain. It has been discovered that, when GaAs is used for the non-linear medium, a peak gain occurs when the GaAs slab is about 0.5 mm thick. The calculated gain values as a function of thickness for a semi-insulating GaAs slab, with an EL2 defect density of $1.2 \times 10^{16}$/cm$^3$, are given in FIG. 5 for probe beam fluences of 15, 20 and 25 mJ/cm$^2$. It can be seen that a gain peak occurs for a slab thickness between 0.5 and 1.0 mm.

An alternate embodiment of the invention is illustrated in FIG. 6, in which elements in common with those of FIG. 1 are indicated by the same reference numerals. Instead of a transmissive prism employing total internal reflection to direct the probe and noise beams 14 and 16 along contra-directional paths, a pair of external mirrors 30 is employed for this purpose.

The invention can be used to provide a self-pumped PCM for pulse beams with much shorter pulse durations than in the past, down to the order of picoseconds. While illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A self-pumped phase conjugate mirror (PCM) for a pulsed optical probe beam having a predetermined pulse duration, comprising:
    a non-linear gain medium for receiving and transmitting said beam, said nonlinear gain medium forming an optical grating in response to the probe beam and a noise beam generated in said medium, said grating having a grating response time greater than the pulse duration of said probe beam, and
    means for directing said noise beam and said probe beam after transmission through said non-linear gain medium along approximately equal time duration return paths as returned probe and noise beams back into said medium for mixing with each other in said medium, thereby inducing a transient transfer of energy from said returned probe beam to said returned noise beam,
    the thickness and optical coupling coefficient of said non-linear gain medium and the angle between said returned probe and noise beams being selected to produce a noise beam gain to generate a phase conjugate of said probe beam.

2. The self-pumped PCM of claim 1, wherein said directing means directs said probe beam and said noise beam along contra-directional paths for return to said non-linear gain medium.

3. The self-pumped PCM of claim 2, said directing means comprising a solid transmissive medium which is substantially transparent to said pulsed optical and noise beams and abuts said optical gain medium, the shape and refractive index of said transmissive medium being selected to direct said beams by total internal reflection.

4. The self-pumped PCM of claim 2, said directing means comprising at least one external reflecting surface spaced from said optical gain medium.

5. The self-pumped PCM of claim 1, the pulse duration of said pulsed optical beam being less than about ten nanoseconds.

6. The self-pumped PCM of claim 6, the pulse duration of said optical beam being less than about one nanosecond.

7. The self-pumped PCM of claim 1, said optical gain medium comprising a semi-insulating semiconductor.

8. The self-pumped PCM of claim 7, said optical gain medium comprising GaAs on the order of 0.5–1 mm thick.

9. A transient energy transfer self-pumped phase conjugate mirror (PCM) system, comprising:
   means for generating a pulsed optical beam having a pulse duration less than about ten nanoseconds,
   a slab formed from a non-linear optical medium positioned in the path of said beam and at an angle thereto to transmit said beam and to generate a noise beam in response to said pulsed optical beam, said non-linear optical medium forming an optical grating in response to an applied optical beam with a grating response time which is greater than said pulse duration,
   reflector means in the paths of said transmitted pulsed optical beam and said noise beam for directing said beams along approximately equal length paths and for returning said beams as returned beams to said non-linear optical medium for mutual mixing therein, the angle between said returned beams being selected to produce a transient energy transfer from the returned pulsed optical beam to the returned noise beam to amplify said return noise beam to a phase conjugate of said pulsed optical beam.

10. The self-pumped PCM system of claim 9, said non-linear optical medium comprising a semi-insulating semiconductor.

11. The self-pumped PCM system of claim 10, said non-linear optical medium comprising GaAs.

12. The self-pumped PCM system of claim 11, the thickness of said slab being on the order of 0.5–1 mm.

13. The self-pumped PCM system of claim 10, said non-linear optical medium being selected from the group comprising GaAs, CdTe and InP.

14. The self-pumped PCM system of claim 9, said reflector means directing said pulsed optical beam and said noise beam along approximately contra-directional paths for return to said non-linear optical medium.

15. The self-pumped PCM system of claim 14, said reflecting means comprising a solid transmissive medium which is approximately transparent to said pulsed optical and noise beams and abuts said non-linear optical medium, the shape and refractive index of said transmissive medium being selected to direct said beams by total internal reflection.

16. The self-pumped PCM system of claim 15, said non-linear optical medium comprising a semi-insulating semiconductor, and said solid transmissive medium comprising a semiconductor.

17. The self-pumped PCM system of claim 9, said reflecting means comprising at least one external reflecting surface spaced from said non-linear optical medium.

18. The self-pumped PCM system of claim 9, the pulse duration of said pulsed optical beam being less than about one nanosecond.

19. A method of forming a phase conjugate of a pulsed optical probe beam having a predetermined pulse duration, comprising:
   providing a non-linear optical medium having an optical grating response time greater than the pulse duration of said probe beam,
   applying said probe beam to said non-linear optical medium to generate a noise beam from said optical medium,
   directing said probe beam and said noise beam along approximately equal duration paths as a returned probe beam and a returned noise beam back into said non-linear optical medium at a predetermined angle to each other for mixing within said non-linear optical medium, said angle and the thickness and optical coupling coefficient of said non-linear optical gain medium being selected to produce a transient energy transfer from said returned probe beam to said returned noise beam and generate a phase conjugate of said probe beam.

20. The method of claim 19, said non-linear optical medium comprising a semi-insulating semiconductor.

21. The method of claim 20, said non-linear optical medium comprising GaAs with a thickness on the order of 0.5–1 mm.

22. The method of claim 19, wherein said pulsed optical and noise beams are directed along substantially contra-directional paths in returning to said non-linear optical medium.

23. The method of claim 19, wherein said pulsed optical and noise beams are directed by total internal reflection from a transparent transmissive medium which abuts said non-linear optical medium.

24. The method of claim 19, wherein said pulsed optical and noise beams are directed by external reflection from at least one reflecting surface which is spaced from said non-linear optical medium.

25. The method of claim 19, wherein the pulse duration of said pulsed optical beam is less than about ten nanoseconds.

26. The method of claim 25, wherein the pulse duration of said pulsed optical beam is less than about one nanosecond.

* * * * *

UNITED STATES PATENT AND TRADEMARK OFFICE
CERTIFICATE OF CORRECTION

PATENT NO. : 5,023,477

DATED : JUNE 11, 1991

INVENTOR(S) : GEORGE C. VALLEY, et al.

It is certified that error appears in the above-identified patent and that said Letters Patent is hereby corrected as shown below:

The title page should be deleted to appear as per attached title page.

The sheet of Drawings consisting of Figs 1,2, and 3 should be deleted and replaced with the attached sheet of Drawing containing Figs. 1,2, and 3.

Signed and Sealed this

Twelfth Day of October, 1993

Attest:

BRUCE LEHMAN

Attesting Officer     Commissioner of Patents and Trademarks

United States Patent [19]

Valley et al.

[11] Patent Number: 5,023,477
[45] Date of Patent: Jun. 11, 1991

[54] TRANSIENT ENERGY SELF-PUMPED CONJUGATOR AND METHOD

[75] Inventors: George C. Valley, Los Angeles; Thomas F. Boggess, Jr., Newbury Park, both of Calif.

[73] Assignee: Hughes Aircraft Company, Los Angeles, Calif.

[21] Appl. No.: 473,532

[22] Filed: Feb. 1, 1990

[51] Int. Cl.$^5$ .......................... G02B 6/32; H03F 7/00; H02J 3/02; H04J 3/00
[52] U.S. Cl. ........................................ 307/425; 372/21; 372/99; 350/96.18; 350/354; 307/3
[58] Field of Search ............... 350/96.10, 96.18, 96.19, 350/354, 356, 362, 3.64; 372/99, 21; 307/2, 3, 4; 455/607, 617

[56] References Cited

U.S. PATENT DOCUMENTS

| | | | |
|---|---|---|---|
| 4,529,273 | 7/1985 | Gronin-Golomb et al. | 350/354 |
| 4,767,195 | 8/1988 | Pepper | 372/21 X |
| 4,773,739 | 9/1988 | Valley et al. | 350/354 |

OTHER PUBLICATIONS

Vinetskii et al., "Transformation of Intensities and Phases of Light Beams by a Transient 'Undisplaced' Holographic Grating", *Sov.J.Quantum Electron.*, vol. 7, No. 2, Feb. 1977, pp. 230–233.
Eichler et al., "Picosecond Pulse Amplification by Coherent Wave Mixing in Silicon", *Physical Review A*, vol. 35, No. 11, Jun. 1, 1987, pp. 4673–4678.
Dubard et al., "Beam Amplifications by Transient Energy Transfer in GaAs and Si", Proceedings of the SPIE, vol. 1017, No. 27, Sep. 1988, pp. 172–175.
Feinberg, "Optical Phase Conjugation in Photorefractive Materials", within the Text Optical Phase Conjugation, ed. by Fisher, Academic Press, Inc., 1983, pp. 417–443.
Feinberg, "Self-Pumped, Continuous-Wave Phase Conjugator Using Internal Reflection", *Optics Letters*, vol. 7, No. 10, Oct. 1982, pp. 486–488.
Cronin-Glomb et al., "Theory and Applications of Four-Wave Mixing in Photorefractive Media", *IEEE Journal of Quantum Electronics*, vol. QE-20, No. 1, Jan. 1984, pp. 12–30.
Auyang and Wolfe, "Free Carrier Induced Third Order Optical Nonlinearities in Semiconductors", *Journal of the Optical Society of America B*, vol. 6, No. 4, Apr. 1969, pp. 595–605.
H. M. Ma, et al, "Picosecond Pulse Amplification by Wave Mixing in GaAs", Appl. Phys. Letter, vol. 54, No. 20. May 15, 1989, 1989 American Institute of Physics, pp. 1953–1955.

*Primary Examiner*—Akm Ullah
*Attorney, Agent, or Firm*—V. D. Duraiswamy; W. K. Denson-Low

[57] ABSTRACT

Self-pumped phase conjugation is achieved for optical beams with very short pulse durations by a transient energy transfer mechanism. A probe beam is transmitted through a non-linear optical medium, generating a noise beam from the medium. The probe and noise beams are directed along equal time duration paths, preferably contra-directional to each other, back into the non-linear medium where they mix with each other. The peak probe pulse is thus mixed with the peak noise pulse to optimize gain. The thickness and optical coupling coefficient of the non-linear medium, and the angle between the returned probe and noise beams, are selected to produce a noise beam gain which is sufficient to generate a phase conjugate of the input probe beam.

26 Claims, 3 Drawing Sheets